United States Patent
Spiegel

(10) Patent No.: US 7,506,815 B2
(45) Date of Patent: Mar. 24, 2009

(54) LASER WATERFOWL REPELLENT

(76) Inventor: H. Jay Spiegel, P.O. Box 11, Mount Vernon, VA (US) 22121

( * ) Notice: Subject to any disclaimer, the term of this patent is extended or adjusted under 35 U.S.C. 154(b) by 441 days.

(21) Appl. No.: 11/354,812

(22) Filed: Feb. 16, 2006

(65) Prior Publication Data

US 2007/0188334 A1    Aug. 16, 2007

(51) Int. Cl.
*A01K 37/00* (2006.01)
*A01M 31/00* (2006.01)

(52) U.S. Cl. ............................. 235/454; 119/713; 43/1

(58) Field of Classification Search ................. 235/435, 235/454; 43/1, 124; 119/713
See application file for complete search history.

(56) References Cited

U.S. PATENT DOCUMENTS

| | | | |
|---|---|---|---|
| 5,915,949 A * | 6/1999 | Johnson | 43/124 |
| 6,250,255 B1 * | 6/2001 | Lenhardt et al. | 119/713 |
| 6,575,597 B1 | 6/2003 | Cramer et al. | |
| 6,793,364 B2 | 9/2004 | Cramer et al. | |
| 2003/0101633 A1 * | 6/2003 | Bhullar | 43/1 |
| 2003/0101634 A1 * | 6/2003 | Bhullar | 43/1 |
| 2006/0225668 A1 * | 10/2006 | Ross et al. | 119/719 |

* cited by examiner

*Primary Examiner*—Daniel A Hess
(74) *Attorney, Agent, or Firm*—H. Jay Spiegel

(57) ABSTRACT

A device to repel and disperse waterfowl entering a proscribed area consists of a laser beam generator generating a laser beam, and a photoelectric switch is provided so that the inventive device is only activated from dusk to dawn. A motion sensor senses the presence of waterfowl and activates the light beam source that is aimed into the area. In the preferred embodiment, a timer is provided that may be set for a desired duration. When the desired duration has elapsed, the controller deactivates the light beam source. The light beam source may consist of a single laser beam or a multiplicity of laser beams shining into the protected area. In one preferred embodiment of the present invention, a single laser beam is split into a plurality or multiplicity of beams using a suitable beam splitter. The inventive device may be equipped with a system that enables one or more laser beams to sweep and oscillate through the protected area so that not only is full coverage of the area assured, but the elevation of the beams is at least, at some points in time, at the level of the eyes of the waterfowl so that the waterfowl can detect the presence of the laser beams and quickly flee the area.

20 Claims, 3 Drawing Sheets

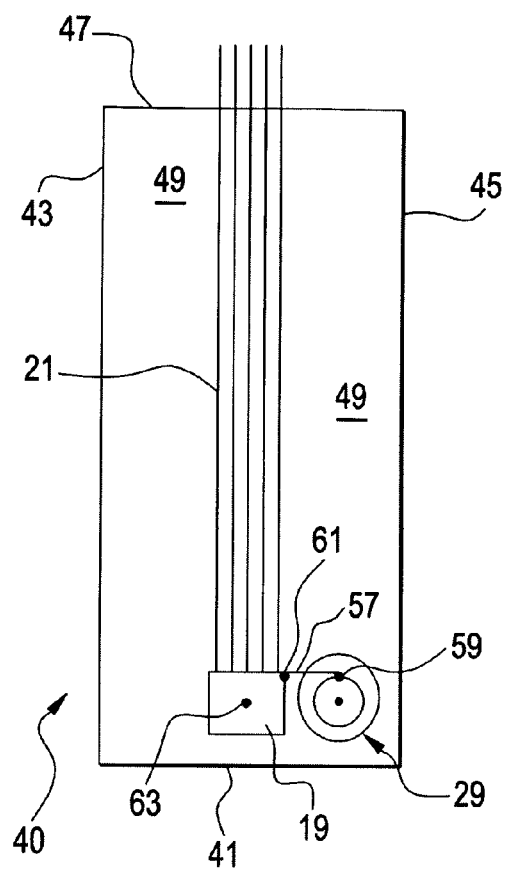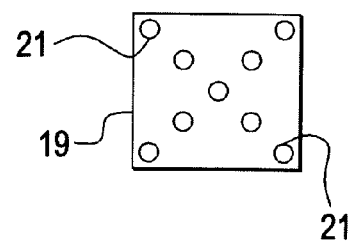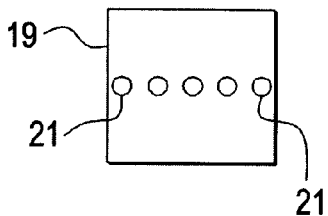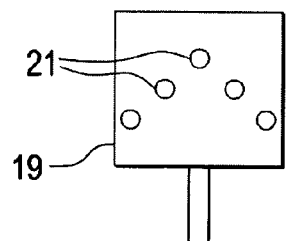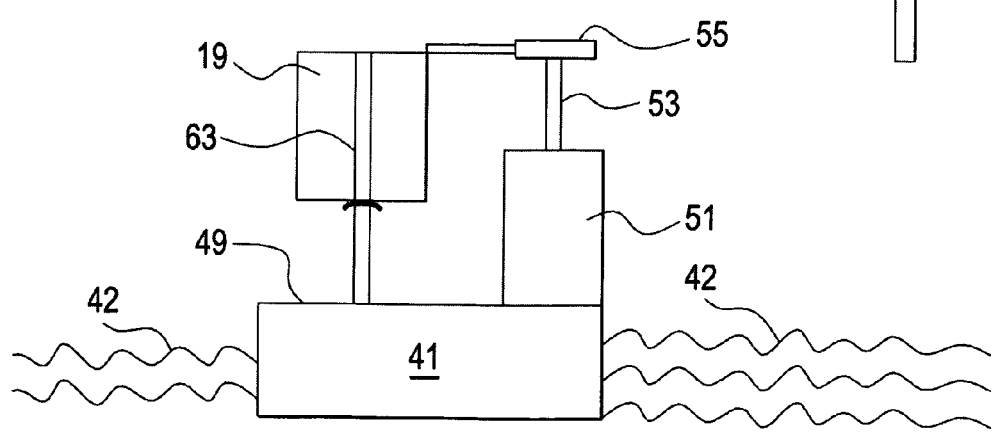

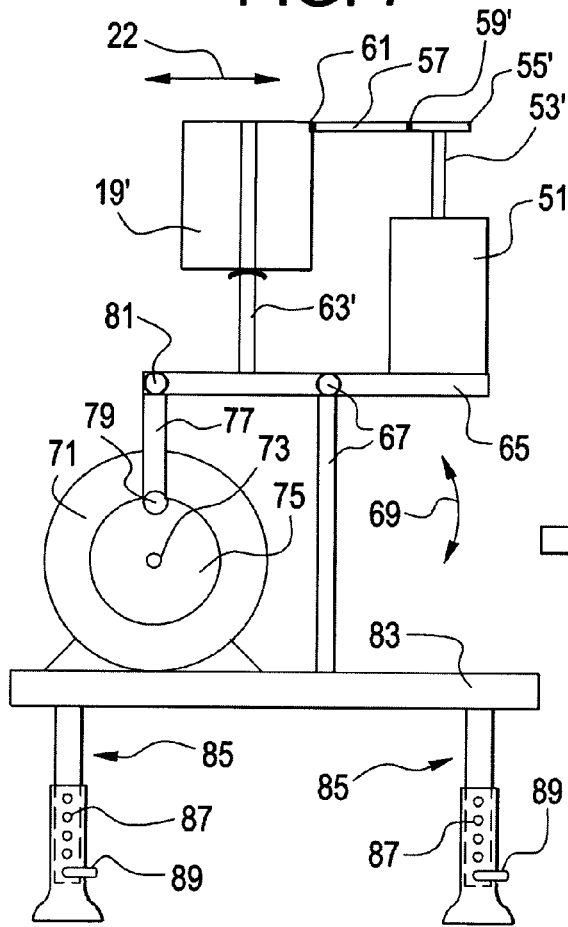
FIG. 7
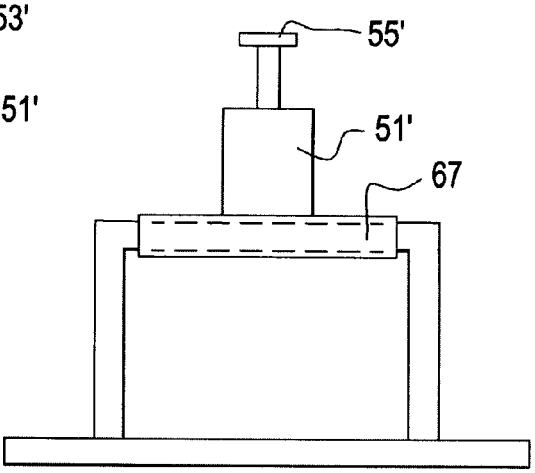
FIG. 8
FIG. 9
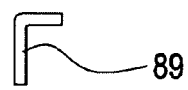
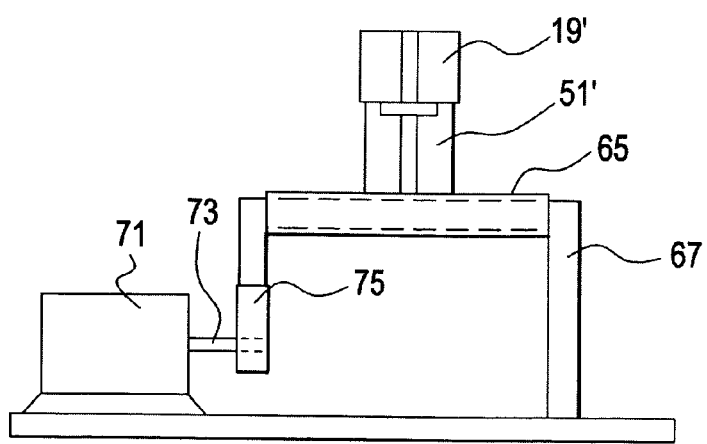
FIG. 10

LASER WATERFOWL REPELLENT

BACKGROUND OF THE INVENTION

The present invention relates to a laser waterfowl repellent. Waterfowl such as geese and ducks are beautiful to observe from a distance. However, they are often a nuisance when they "graze" on one's yard, particularly, when they leave large deposits of feces behind. Geese, in particular, are stubborn animals. If they are chased away, more often than not, they will return over and over again. Studies have shown that migratory waterfowl are responsible for international spread of Avian flu. As such, it has become important to avoid contact with these wild animals.

Even in this day and age, solutions to the problems of nuisance waterfowl are few and far between. Chemical repellents are often used in grassy areas to make the grass unpalatable for eating waterfowl. Such chemicals are useless when trying to keep waterfowl off a dock, pier or other non-grassy area.

Noisemakers are often used, particularly at airports, to control when large waterfowl and other birds take off to best avoid having them sucked into gas turbine engines with the resultant engine failure. However, employing a device in a residential neighborhood that emits large blasts of sound is not the most neighborly thing to do. Other possible solutions to rid areas of nuisance waterfowl include placement of fake owls, installation of inflatable balloons having large eyes printed thereon, and barriers that preclude the waterfowl from entering areas where such restriction is desired. Animals such as border collies are also employed, but it is expensive to obtain and care for them.

In the case of barriers, they also make those areas inhospitable for people who must traverse the barriers to enter the area. It is also known that devices such as fake owls, inflatable balloons and fake inflatable snakes only deter waterfowl for short periods of time unless they are continually moved to different locations and orientations.

It is generally known to use laser energy to disperse waterfowl. A website at www.birdcontrolsupplies.com sells a "Bird Phazer PRO Laser" which basically consists of a hand-held laser beam generating device, battery powered, that may be used in the user's hand to shine a laser beam on the offending waterfowl to disperse them. Such a device, while generally effective, requires the presence of the user manipulating it.

In the particular situation of a floating dock, typically, the waterfowl enter onto the dock sometime after dusk and leave sometime before dawn. During these hours, it is often inconvenient for a property owner to use a hand-held device to disperse the waterfowl. Thus, a need has developed for a device that may effectively repel waterfowl and that does not require the presence of the property owner to do so.

It is with these issues in mind that the present invention was developed.

The concept of the laser beam generating device is extremely well known as of this date. Laser beam generating devices commonly generate laser beams of either red or green color. Red colored laser beams are at the edge of the visible light spectrum for humans and most animals. As such, when a red colored laser beam is generated, typically, all that may be seen is a dot where the beam impinges on a solid surface. By contrast, green colored laser beams are more toward the middle of the visible spectrum. What this means is that when a green colored laser beam is activated, not only is a dot visible on a solid surface where the beam impinges, at night, the beam emanating from the generator is also somewhat visible. The visibility of the entire beam from the source to where it impinges on a solid surface has been found to be an advantageous feature when attempting to disperse and repel waterfowl.

Laser beams may be split into a plurality of separate beams by any known means such as fiberoptic beam splitters, prisms, mirrors or some combination of these devices. The following U.S. patents teach various kinds of optical light beam splitters:

U.S. Pat. No. 6,084,717 to Wood et al.
U.S. Pat. No. 6,381,073 to Wilson
U.S. Pat. No. 6,609,815 to Waibel et al.

SUMMARY OF THE INVENTION

The present invention relates to a laser waterfowl repellent. The present invention includes the following interrelated objects, aspects and features:

(1) In a first aspect, the present invention is intended as a device to be mounted in position so that it may be used to repel and disperse waterfowl entering a proscribed area. In its simplest form, the present invention consists of a laser beam generator generating a laser beam, preferably of a red or green color that shines within the area where waterfowl are to be repelled and dispersed.

(2) Recognizing that waterfowl typically enter areas where they are unwanted from dusk to dawn hours, in a further aspect of the present invention, in the preferred embodiment thereof, a photoelectric switch is provided so that the inventive device is only activated from dusk to dawn or when light intensity falls below a pre-set level.

(3) When the inventive device is activated, in the preferred embodiment, a motion sensor is provided to sense the presence of waterfowl within the area that is being protected by the inventive device. When the motion sensor senses the presence of waterfowl within the protected area, a signal is sent to a controller that activates the light beam source that is aimed into the area.

(4) It has been found that within a couple of minutes, at most, the presence of a light beam source such as a laser beam will frighten waterfowl and cause them to leave the area. As such, in the preferred embodiment, the inventive device is equipped with a timer that may be set for a desired duration. When the desired duration, for example, one or two minutes, has elapsed, the controller deactivates the light beam source.

(5) The light beam source, in a preferred embodiment, may consist of a single laser beam or a multiplicity of laser beams shining into the protected area. In one preferred embodiment of the present invention, a single laser beam is split into a plurality or multiplicity of beams using a suitable beam splitter. Beam splitters are well known per se and can include one or more prisms, mirrors or optical fibers. In the case of optical fibers, a single optical fiber is exposed to the light beam and is connected through an optical manifold to a plurality or multiplicity of optical fibers that are aimed in desired directions.

(6) For even more effective operation, the inventive device may be equipped with a system that enables one or more laser beams to sweep and oscillate through the protected area so that not only is full coverage of the area assured, but the elevation of the beams is at least, at some points in time, at the level of the eyes of the waterfowl so that the waterfowl can detect the presence of the laser beams and quickly flee the area. In this regard, the mechanism may move the beams from side-to-side, up and down, or some combination of the two.

(7) Additionally, if desired, a plurality of laser beams may be provided, either through one beam that is split or through the use of a plurality of individual beams and they may be arranged in any one of a number of patterns such as (a) all at the same elevation, (b) at ascending and descending consecutive elevations, (c) in a cross configuration, or any other desired pattern. In this way, full coverage of the entire area to be protected and at elevations assuring visibility to the waterfowl will occur.

As such, it is a first object of the present invention to provide a laser waterfowl repellent.

It is a further object of the present invention to provide such a device operable from dusk to dawn.

It is a still further object of the present invention to provide such a device in which a motion sensor senses the presence of waterfowl in an area to be protected and the device is consequently activated.

It is a still further object of the present invention to provide such a device in which a single laser beam is employed.

It is a still further object of the present invention to provide such a device in which a plurality of laser beams are employed, either through the use of individual laser beam generators or a single laser beam generator associated with a splitter.

It is a still further object of the present invention to provide such a device in which the beams that are generated are swept in varying patterns within the area to be protected.

It is a still further object of the present invention to provide such a device with a timer to time duration of beam operation.

These and other objects, aspects and features of the present invention will be better understood from the following detailed description of the preferred embodiments when read in conjunction with the appended drawing figures.

BRIEF DESCRIPTION OF THE DRAWINGS

FIG. 2 shows a top view of one example of an installation of the present invention.

FIG. 3 shows an end view of the installation of FIG. 2.

FIG. 4 shows one embodiment of a configuration of light beams in accordance with the teachings of the present invention.

FIG. 5 shows a second configuration of light beams.

FIG. 6 shows a third configuration of light beams.

FIG. 7 shows an end view of a further embodiment of the present invention.

FIG. 8 shows a side view of the embodiment of FIG. 7 with portions omitted to show detail.

FIG. 9 shows a side view of a pin also shown in FIG. 7 for locking the height of the device illustrated in FIG. 7.

FIG. 10 shows a view 90° rotated from the view of FIG. 7 with portions omitted to show detail.

SPECIFIC DESCRIPTION OF THE PREFERRED EMBODIMENTS

Figure 1:
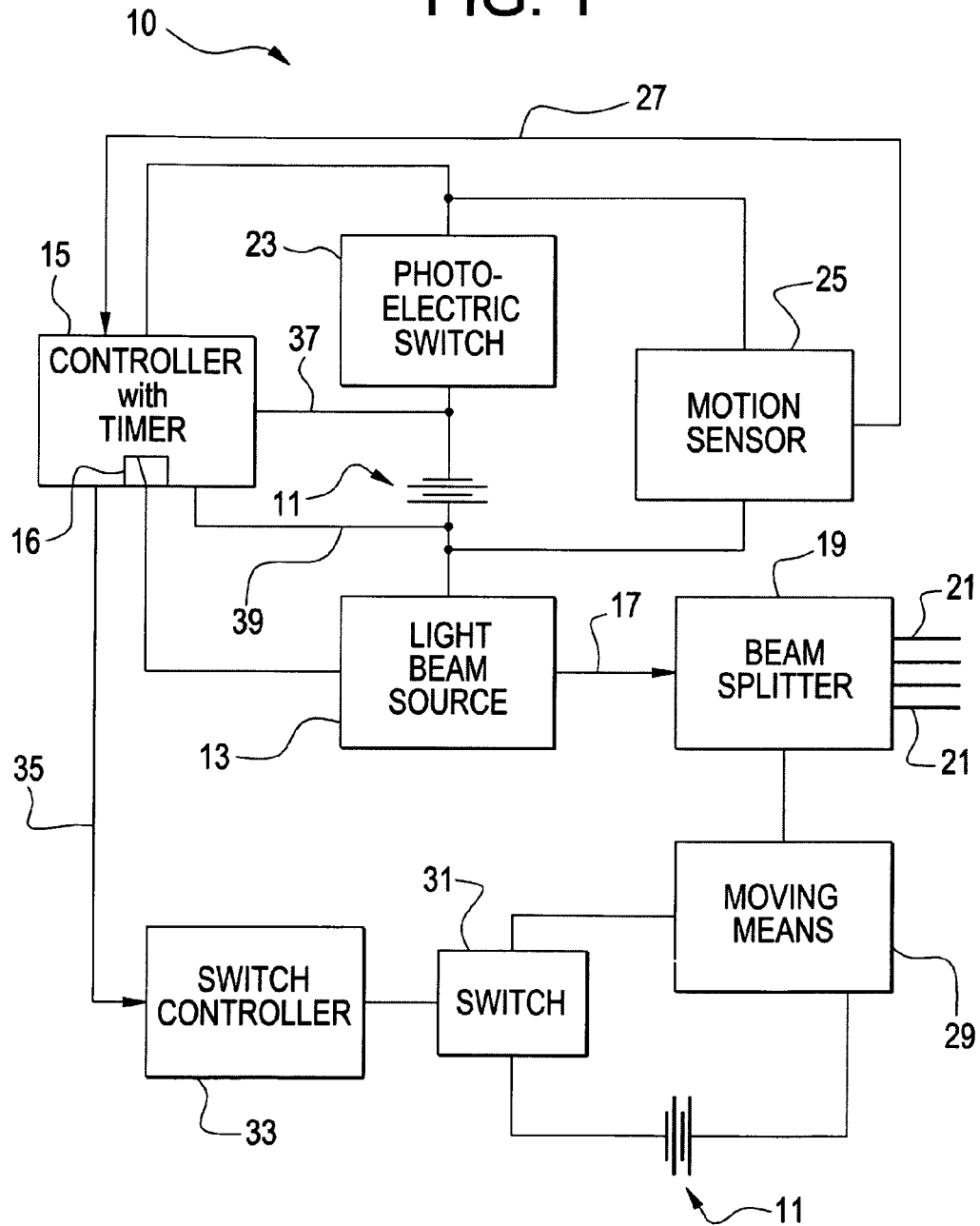
FIG. 1 shows a schematic representation of the electrical circuitry of the present invention.

Reference is first made to FIG. 1 which shows a schematic representation of the electrical circuitry of the present invention. The circuitry is generally designated by the reference numeral 10 and is seen to include a source of power 11 which may, if desired, be 12 volt DC power, a light beam source 13, and a controller with timer 15. The light beam source may be a source of laser light or other concentrated light beam.

As seen in FIG. 1, a light beam 17 is emitted from the light beam source 13 and enters a beam splitter 19 where it is split into a plurality of beams 21. The beams 21, emitted by the beam splitter 19, are aimed within a region or space where it is desired to disperse and repel nuisance waterfowl.

The prime time of day when nuisance waterfowl are at their worst is typically from dusk until dawn. As such, a photoelectric switch 23 is provided in the circuitry 10. The photoelectric switch senses the dimming of light at dusk and the restoration of light at dawn. When light intensity is below a pre-set threshold, the photoelectric switch closes, thereby closing the circuit 10.

When the photoelectric switch 23 is closed, this does not automatically activate the light beam source. The controller with timer 15 maintains the circuit 10 open until a condition is sensed requiring its activation.

With further reference to FIG. 1, the circuit 10 includes a motion sensor 25 that is configured to sense motion of nuisance waterfowl within the space or region where the inventive system is operating. When the motion sensor 25 senses an incursion by one or more nuisance waterfowl, a signal is sent along the conductor 27 to the controller with timer 15. When the controller with timer 15 receives the signal from the motion sensor 25, its internal switch 16 is closed that provides power to the light beam source 13 and activates the light beam 17. The light beam 17 enters the beam splitter 19 and is split into the beams 21 that are trained on the region or area that is being protected.

Simultaneous with closure of the internal switch 16 of the controller with timer 15, the controller with timer's timer begins operating. The timer within the controller with timer 15 begins operating timing a pre-set period of time after which the switch 16 is opened, thereby terminating operation of the light beam source 13. It has been found that a concentrated light beam will disperse nuisance waterfowl within a short period of time, typically no more than a minute or two. As such, the internal timer in the controller with timer 15 may be pre-set to maintain the switch 16 closed for a time period of one to two minutes, for example, after which the switch 16 is opened, thereby terminating emanation of the concentrated light beam 17. Once the switch 16 is opened, the next time the motion sensor 25 senses an incursion of nuisance waterfowl, another signal is sent along the conductor 27 to reactivate the system.

The most effective use of the present invention occurs when the nuisance waterfowl see the light beams 21, particularly when those light beams are shone into the eyes of the waterfowl. Movement of the light beams enhances effectiveness of the present invention. As such, in an advantageous embodiment of the present invention, moving means 29 are provided to allow movements of the light beams 21 within the proscribed space. The moving means 29, as will be explained in greater detail hereinafter, may oscillate the beams 21 back and forth or up and down or some combination of these movements. Up and down as well as side-to-side movements enhance effectiveness because they account for differing heights of the various waterfowl themselves.

The moving means 29 is connected into the power source 11 and a switch 31 controls closure of the sub-circuit including the moving means. A switch controller 33 is connected to the controller with timer 15 by an electrical conductor 35. If desired, the switch 31 may be a solenoid actuated switch spring biased to the open position. When the switch controller 33 is activated, it provides current to the solenoid to close the switch 31. When current is removed from the controller 33, the solenoid is deactivated and the spring opens the switch 31. When the controller with timer 15 closes the switch 16, it also sends a signal via the conductor 35 to the switch controller 33 to close the switch 31 and activate the moving means 29. When the controller with timer 15 opens the switch 16, it signals the switch controller 33 to open the switch 31 and stop operation of the moving means.

In an important aspect, the controller with timer 15 is always powered up by the conductors 37, 39 connected across the power source 11.

With reference to FIGS. 2 and 3, one example of an embodiment of use of the present invention will now be explained. With reference to FIGS. 2 and 3, a floating dock 40 includes an end wall 41 and side walls 43 and 45. An opposite end wall 47 is also shown. Floating docks are particularly attractive to nuisance waterfowl because the height of their top surface 49 is maintained at the same elevation with respect to the surface of adjacent water 42, regardless of the tide condition or non-tidal water elevation. That distance is typically less than one foot and nuisance waterfowl can swim up to a dock and easily hop on top of the top surface 49.

In FIGS. 2-3, only so much of the structure of FIG. 1 is shown to facilitate understanding of the use. The beam splitter 19 emanates the beams 21 over the top surface 49 of the dock. The moving means 29, in one embodiment, consists of a motor 51 having a drive shaft 53, and a disk 55 at the end of the shaft 53 which, as best seen in FIG. 2, has a rod 57 attached at a pivot 59 located at the periphery of the disk 55. The other end of the rod 57 is pivotably mounted at a pivot 61 located at a corner of the beam splitter 19. As understood from FIGS. 2 and 3, the beam splitter 19 is mounted on a shaft 63 about which it is pivotable. Thus, when the motor 51 is activated and its shaft 53 rotates, the rod 57 reciprocates back and forth causing the beam splitter 19 to pivot back and forth about the pivot pin 63. This causes the beams 21 to sweep back and forth in an arcuate motion over the top surface 49 of the dock 40.

FIGS. 4, 5 and 6 show three embodiments of the beam splitter 19 depicting different patterns of emanation for the beams 21. In particular, the patterns shown in FIGS. 4 and 6 allow sweeping of different elevations across the top surface 49 of the dock. This helps to account for nuisance waterfowl of differing heights.

With reference now to FIGS. 7-10, a further embodiment of the present invention is shown. In that embodiment, the structure illustrated in FIGS. 2 and 3 is shown with like primed reference numerals. The entirety of that structure is mounted on a platform 65 that is pivotably mounted on a pivot support 67 that permits pivoting of the platform 65 in the directions of the arcuate arrow 69 shown in FIG. 7. A further motor 71 includes a drive shaft 73 and a disk 75 on which a rod 77 is mounted using a pivot pin 79. The other end of the rod is pivotably mounted on the platform 65 via the pin 81. Thus, rotations of the shaft 73 result in pivoting up and down of the platform 65 in the directions of the arrow 69. Thus, from FIG. 7, in particular, it should be understood that when the motor 51' is activated, the splitter 19' pivots back and forth in the directions of the arrow 22. When the motor 71 is activated, the platform 65 pivots in the directions of the arrow 69. When both motors are simultaneously activated, the beam splitter 19' pivots back and forth and moves up and down to cause the light beams 21 to rapidly move in quickly changing up and down and side-to-side movements which helps to startle and repel the nuisance waterfowl.

With reference to FIG. 7, the motor 71 and pivot 67 are mounted on a further platform 83 that may be supported on telescoping legs 85 that may be height adjustable through the use of a series of holes 87 and pins 89 insertable within aligned holes in the respective telescoping sections. A pin 89 is also shown in FIG. 9.

In the embodiment of FIGS. 7-10, the relationships of locations of light beams with respect to one another may be such as is shown in FIGS. 4-6 or any other desired pattern.

In the preferred embodiments of the present invention, the light beams that are used are laser beams. The splitter, if used, may employ mirrors, prisms, optical fibers, or any desired combination of those elements as is known to those of ordinary skill in the art. Alternatively, a plurality of laser beams may be used without a splitter.

Concerning the laser beams employed, the preferable color for the beams is a green color. The green color is particularly effective because the beam itself is highly visible, particularly at night. One preferred wavelength for a green laser beam is at or about 532 nm.

Red laser beams are also useful in accordance with the teachings of the present invention, but are somewhat less effective because their light is closer to the edge of the visible light spectrum and, as such, the beam itself is not as visible as the beam from a green laser beam.

Through use of the present invention, it is possible to keep an area or region such as a lawn, floating dock, fixed pier, or other area free of nuisance waterfowl and the feces and other waste they leave behind.

As such, an invention has been disclosed in terms of preferred embodiments thereof which fulfill each and every one of the objects of the invention as set forth hereinabove, and provide a new and useful laser waterfowl repellent of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. An animal repellent, comprising:
   a) a source of concentrated light and a splitter having an input to receive light from said source and a plurality of secondary light outputs;
   b) said source being mounted adjacent a space;
   c) a sensor for sensing movement of an animal within said space;
   d) a controller receiving signals responsive to said movement and, in response thereto, activating said source.

2. The animal repellent of claim 1, wherein said source of concentrated light comprises a laser beam.

3. The animal repellent of claim 2, wherein said laser beam is green.

4. The animal repellent of claim 1, wherein said splitter includes at least one optical fiber.

5. The animal repellent of claim 1, wherein said splitter includes at least one prism.

6. The animal repellent of claim 1, wherein said splitter includes at least one mirror.

7. The animal repellent of claim 1, wherein said outputs are linearly aligned.

8. The animal repellent of claim 7, wherein said outputs are horizontally linearly aligned.

9. The animal repellent of claim 7, wherein said outputs are diagonally linearly aligned.

10. The animal repellent of claim 7, wherein said outputs form a cross-like configuration.

11. The animal repellent of claim 1, further including a timer for timing a time period during which said source is activated.

12. The animal repellent of claim 1, further including moving means for moving said source in a desired pattern of motion.

13. The animal repellent of claim 12, wherein said desired pattern includes a sweeping motion.

14. The animal repellent of claim 13, wherein said desired pattern includes an up and down motion.

15. A waterfowl repellent, comprising:
 a) a source of LASER light;
 b) said source being mounted adjacent a space;
 c) a sensor for sensing movement of waterfowl within said space;
 d) a controller receiving signals responsive to said movement and, in response thereto, activating said source;
 e) moving means for moving said source in a desired pattern of motion; and
 f) a splitter having an input to receive said LASER light from said source and a plurality of secondary light outputs, said splitter having optical means chosen from the group consisting of an optical fiber, prism and mirror.

16. The waterfowl repellent of claim 15, wherein said LASER light is green.

17. The waterfowl repellent of claim 15, wherein said outputs are linearly aligned.

18. The waterfowl repellent of claim 15, further including a timer for timing a time period during which said source is activated.

19. The waterfowl repellent of claim 15, wherein said desired pattern includes a sweeping motion.

20. The waterfowl repellent of claim 19, wherein said desired pattern includes an up and down motion.

* * * * *